United States Patent
Talmor et al.

(10) Patent No.: US 11,900,105 B2
(45) Date of Patent: Feb. 13, 2024

(54) CODE REVIEW SYSTEM WITH DEVELOPMENT ENVIRONMENT INTEGRATION

(71) Applicant: RED HAT, INC., Raleigh, NC (US)

(72) Inventors: Avraham Talmor, Rishon Letzion (IL); Arie Bregman, Gan Yavne (IL); Ilan Gersht, Bat Yam (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/105,343

(22) Filed: Nov. 25, 2020

(65) Prior Publication Data

US 2022/0164183 A1    May 26, 2022

(51) Int. Cl.
*G06F 8/73*    (2018.01)
*G06F 8/33*    (2018.01)

(52) U.S. Cl.
CPC . *G06F 8/73* (2013.01); *G06F 8/33* (2013.01)

(58) Field of Classification Search
CPC ...................................... G06F 8/33; G06F 8/73
See application file for complete search history.

(56) References Cited

U.S. PATENT DOCUMENTS

| | | | | |
|---|---|---|---|---|
| 8,635,598 B2* | 1/2014 | Roberts | ...................... | G06F 8/33 717/125 |
| 9,201,646 B2 | 12/2015 | Balachandran | | |
| 9,594,544 B2* | 3/2017 | Wang | ........................ | G06F 8/38 |
| 9,733,933 B1 | 8/2017 | Arquero et al. | | |
| 10,915,316 B1* | 2/2021 | Turner | ................... | G06F 9/3844 |
| 2008/0098356 A1* | 4/2008 | Ericsson | .................... | G06F 8/73 717/123 |
| 2008/0295085 A1* | 11/2008 | Rachamadugu | .......... | G06F 8/75 717/159 |
| 2009/0271768 A1 | 10/2009 | Goodson | | |

(Continued)

OTHER PUBLICATIONS

Akshay Kalyan et al., "A Collaborative Code Review Platform for GitHub," 2016 [retrieved on Aug. 25, 2023], 21st International Conference on Engineering of Complex Computer Systems (ICECCS), pp. 191-196, downloaded from <url>:https://ieeexplore.ieee.org. (Year: 2016).*

(Continued)

*Primary Examiner* — S. Sough
*Assistant Examiner* — Stephen D Berman
(74) *Attorney, Agent, or Firm* — Lowenstein Sandler LLP

(57) ABSTRACT

A method identifies a proposed change associated with a source code file that comprises changed content, identifies a review comment associated with the proposed change, wherein the review comment is further associated with reviewed content of the source code file, presents, via a user interface, a notification indicating that the proposed change has been reviewed, receives, via the user interface, a request to present the review comment, and, responsive to receiving the request to present the review comment, presents, via the user interface, the review comment in association with the reviewed content. The review comment may be presented in visual association with the reviewed content in the user interface. A line of text of the review comment may be presented at a location adjacent to a line of text of the reviewed content in the user interface.

16 Claims, 6 Drawing Sheets

(56) References Cited

U.S. PATENT DOCUMENTS

| | | | |
|---|---|---|---|
| 2015/0242206 A1* | 8/2015 | Velusamy | G06F 8/33 |
| | | | 717/121 |
| 2016/0266896 A1* | 9/2016 | Fan | G06F 8/33 |
| 2017/0168816 A1* | 6/2017 | Dow | G06F 8/73 |
| 2019/0004925 A1* | 1/2019 | Buckingham | G06Q 10/101 |
| 2019/0303107 A1* | 10/2019 | Kelly | G06N 20/20 |
| 2020/0192638 A1* | 6/2020 | Pezaris | G06F 8/73 |

OTHER PUBLICATIONS

Alice, "Review Assistant—Peer code review tool for Visual Studio", https://www.ryadel.com/en/review-assistant-visual-studio-peer-code-tool-plugin-addon-extension/, Dec. 14, 2019, 9 pages.

Robert Chatley, "Diggit: Automated Code Review via Software Repository Mining", https://www.doc.ic.ac.uk/~rbc/papers/saner-diggit-18.pdf, Imperial College London, UK; GoCardless Ltd London, UK, 2018, 5 pages.

Lars Vogel, "Using the Eclipse IDE for Java Programming—Tutorial", https://www.vogella.com/tutorials/Eclipse/article.html, Vogella GmbH, 2007-2020, 62 pages.

"Code Review Guide—Release", https://owasp.org/www-pdf-archive/OWASP_AlphaRelease_CodeReviewGuide2.0.pdf, OWASP, 2017, 223 pages.

* cited by examiner

FIG. 3A

Development Environment UI 200

Editor 202

File: ProcessData.py  302

```
[Betty] Sorting seems inefficient     — Review Comment 304a
Consider using a more                 — 306a
efficient sorting algorithm.
def doSort(arr):
    bubbleSort(arr)                      — Review Comment 304b
                                         Review Comment File Position 306b
def receiveData():
    arr = inputData()
    return arr def processDwhere():
    data = receiveData()      — 306c   304c
    doSort(data)   ## Just call List.sort()?
    logData("Sorted data:", data)
```

FIG. 3B

Development Environment UI 200

Editor 202

File: ProcessData.py  204

```
def doSort(arr):              — Reviewed Content 305a
    bubbleSort(arr)

def receiveData():            — Reviewed Content Location 308a
    arr = inputData()
    return arr def processData():
    data = receiveData()   308b
    doSort(data)
    logData("Sorted data:", data)
    return data
                              — Reviewed Content 305b
```

FIG. 3C

Development Environment UI 200

Editor 202

File: ProcessData.py  204

```
Sorting seems inefficient            — 314a
                                     — 316a
Consider using a more                — 314b
efficient sorting algorithm.
def doSort(arr):                     Review Comment Location 316b
    bubbleSort(arr)

def receiveData():
    arr = inputData()
    return arr               Reviewed Content Location 308a def processData():
    data = receiveData()
    doSort(data)
```

FIG. 3D

Development Environment UI 200

Editor 202

File: ProcessData.py  204

```
def doSort(arr):
    bubbleSort(arr)

def receiveData():
    arr = inputData()
    return arr              Reviewed Content Location 308b def processData():
    data = receiveData()
    doSort(data)                         — 314c
    Just call List.sort()? [Betty]
    logData("Sorted data:", data)   316c
    return data
```

CODE REVIEW SYSTEM WITH DEVELOPMENT ENVIRONMENT INTEGRATION

TECHNICAL FIELD

The present disclosure is generally related to computer program code development, and more particularly, to code review systems with development environment integration.

BACKGROUND

Computer systems can be programmed to perform operations specified by sequences of instructions referred to as computer program code. Application programs, operating systems, and other computer programs are implemented as computer program code that is written by human developers with the assistance of applications that perform tasks related to code development. These applications are often referred to as development tools, development environments, or integrated development environments (IDEs). An IDE can provide a text editor for creating and editing source code in a particular programming language, as well as tools for creating user interfaces, compiling source code to produce executable program code, and running the executable code.

Code written by one person can be reviewed by others to check for correctness, efficiency, conformance with coding guidelines, possible improvements, and so on. The reviewers may provide feedback and suggested changes to the author. This practice is referred to as "code review" and can be performed during the development process to refine or identify errors or other issues in the program code.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3A-3D depict example user interfaces of a development environment editor displaying review comments, in accordance with one or more aspects of the present disclosure;

DETAILED DESCRIPTION

Figure 1:
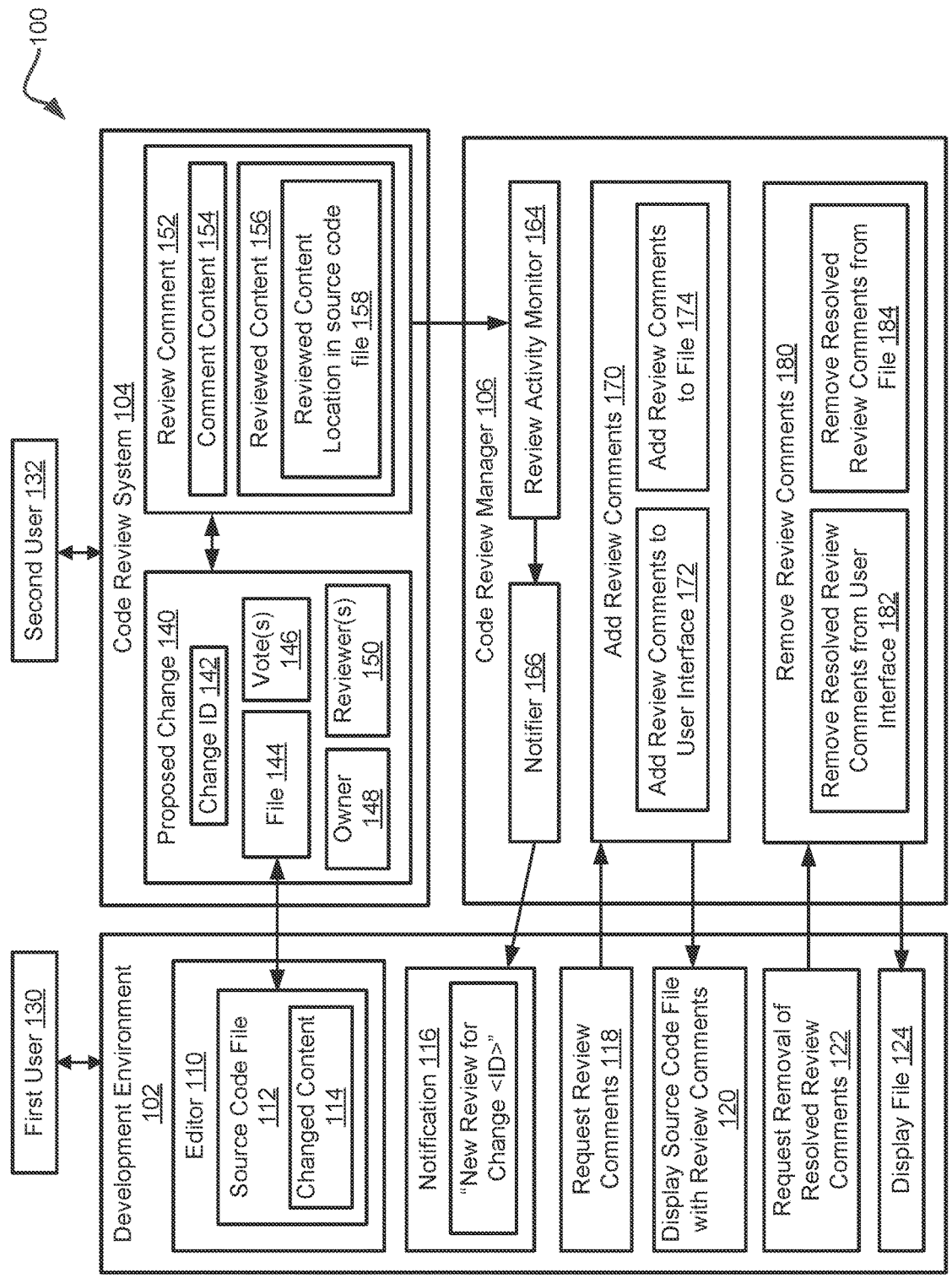
FIG. 1 depicts a high-level block diagram of an example computing environment that includes a code review manager that integrates a code review system with a development environment, in accordance with one or more aspects of the present disclosure.

Described herein are systems and methods for integrating a code review system with a development environment. A development environment, such as a text editor or an Integrated Development Environment (IDE), may be used to develop (e.g., create, test, and change) computer program code in a programming language such as C, C++, JAVA, PYTHON, RUBY, and so on. The program code may be in the form of source code stored in files that are processed by interpreters or compilers for the language in which the program code is written. The interpreters or compilers may convert the source code to instructions executable by a processor. The source code may be stored in a version control system, e.g., GIT, GITHUB, RCS, or the like. A user of the development environment may make changes to the source code and store the changed source code as a new version, e.g., with a new version number, in the version control system. A code review system, such as GERRIT, may access the source code in the version control system or other file storage system. The code review system may be used by reviewers to view, comment on, approve, or reject the changes that are made to the source. Reviewers may identify potential errors, inefficiencies, or other issues in the source code and inform the author of the source code, so that the author can revise the source code accordingly. Source code that is approved by appropriate reviewers may be incorporated into a project being developed.

However, existing code review systems are separate from development environments, and using code review systems with development environments is cumbersome and time-consuming. For example, a development environment, in which a user creates and modifies source code using a text editor, ordinarily has a separate user interface from the code review system. Thus, a user may make a change to source code using the development environment, then switch to the code review system's user interface and submit the change to the code review system. A reviewing user may similarly switch from a development environment user interface to the code review system user interface to review the change. In the code review system user interface, the reviewing user may comment on the change, submit the comments, and then switch back to the development environment user interface. The user who created the change may then use the code review system to view the reviewer's comments. To revise the source code, the user who created the change may use the development environment to edit the source code while also viewing the reviewer's comments in the code review system. Thus, the user may need to switch their attention back and forth between the development environment and the code review system repeatedly to revise the code. Switching between user interfaces interrupts a user's work and ordinarily involves switching to a user interface that interacts with the user differently from the code review system, which can interrupt the user's concentration.

Aspects of the present disclosure address the above-noted and other deficiencies by enhancing a program code development environment with the ability to facilitate various code review operations. A code review manager component can receive code review information, such as comments submitted by reviewing users, and present the code review information in the development environment's user interface. The code review manager component can also provide user interface features that perform code review-related operations, such as displaying or removing comments in reviewed code in the development environment's user interface, and sending an indication that the reviewed code has been revised to the code review system.

As noted above, reviewers can submit feedback on particular portions of source code files to the code review system in the form of review comments. Each review comment can thus be associated with a corresponding item of reviewed content of a source code file. "Reviewed content" shall herein refer to designated content of a file that is associated with a review comment. For a particular review comment, the associated reviewed content may be understood as the portion of the file upon which a reviewer comments. The reviewer may designate the reviewed content as part of a process of reviewing the file. The term "reviewed content" refers to a file portion that a reviewer has designated as being associated with a review comment. The term "reviewed content" does not necessarily imply that the reviewer has reviewed the content. Multiple review comments may be associated with a source code file, and each review comment may be associated with an item of reviewed content that corresponds to a designated portion of the source code file. Two or more items of reviewed content in a source code file may correspond to different portions of the file, to partially overlapping portions of the file, or to the same portion of the file. Thus, a source code file associated with multiple review comments may have multiple items of reviewed content, and each reviewed comment can correspond to any designated portion of the source code file.

A code review manager component can identify review comments, e.g., by detecting that the review comments have been created in a code review system, and send the review comments to the development environment. The development environment can be enhanced to present the review comments in a visual association with the source code files that contain the corresponding reviewed content, e.g., without modification of the source code files. The review comments can be displayed at their corresponding locations within the source code files in the development environment's code editor user interface. Each review comment can be presented in the development environment's code editor in response to user input associated with the reviewed content, such as a mouse hover or touch screen event at a location of the reviewed content. A review comment can be presented in response to a user positioning a mouse cursor over or performing another type of interaction (e.g., touch interaction) with the corresponding reviewed content, for example. A review comment can be displayed adjacent to or partially overlapping the corresponding reviewed content. For example, a review comment can be displayed on a line prior to, on a line subsequent to, or on the same line as the corresponding reviewed content of a source code file.

Alternatively or additionally to presenting review comments in association with items of reviewed content of a source code file, review comments can be translated to programming language comments and inserted in the source code file that contains the corresponding reviewed content at positions in the file that correspond to the reviewed content. Each programming language comment can be removed from the file in response to a user request, or in response to a change made to the corresponding reviewed content. Alternatively or additionally, a programming language review comment can be inserted into the source code file at a location in the file adjacent to (e.g., before, after, on a line prior to, or on the same line as) the corresponding reviewed content.

A user can make suitable changes to the corresponding source code file as a response to a review comment, e.g., by changing one or more characters of the reviewed content and saving the changes in an updated source code file. The change(s) can be detected by the code review manager, and an indication that a change associated with the review comment has been made can be sent to the code review system. The code review system can then inform the reviewer that the review comment has been addressed, and the reviewer can review the updated source code file. Thus, a user of the development environment can view review comments, make code revisions, and respond to the review comments in the development environment without switching back and forth between the development environment and the code review system.

In particular embodiments, a code review manager component can integrate a development environment with a code review system. A first user, who can be a program code developer ("developer"), can make a proposed change to one or more source code files in a development environment and submit the proposed change to the code review system. The code review manager component can identify the proposed change, which is with a modification to a source code file. The proposed change can include or identify content of the proposed change, e.g., content that has been added to or removed from the file. The code review manager can identify a review comment directed to reviewed content. The reviewed content can be a portion of the source code file, such as the content of the proposed change. The code review manager can present, to the first user, a notification indicating that the proposed change has been reviewed. The notification can be presented in the development environment, for example. The user can respond to the notification by invoking a command that displays or otherwise presents the review comment in the development environment. The display command can cause a request for the review comment to be sent to the code review manager component, e.g., by the development environment. The code review manager can receive the request for the review comment and cause the development environment to present the review comment in association with the reviewed content of the source code file. The review comment can be presented in visual association with the reviewed content, for example. Alternatively or additionally, the review comment can be presented by translating the review comment to a programming language comment, and inserting the programming language comment in the source code file at a position that corresponds to the reviewed content (e.g., prior to or subsequent to the reviewed content), and displaying the resulting source code file. Displaying the resulting source code file may cause the review comment to be presented in visual association with the reviewed content, since the review comment can be inserted into the source code file in association with, e.g., in a position adjacent to, the reviewed content.

Various aspects of the above referenced methods and systems are described in details herein below by way of examples, rather than by way of limitation. The examples provided below discuss a code review manager that integrates a development environment with a code review system. In other examples, the methods and systems described herein can be performed by any suitable component that interacts with the development environment and the code review system. In other examples, the code review manager can receive code review comments from any system that provides code review comments, and communicate the code review comments to any suitable system that includes a source code editor, and send status information, such as an indication that a source code file corresponding to the comment has been edited, or the review comment has otherwise been addressed, to the system that provides code review comments.

FIG. 1 depicts a high-level block diagram of an example computing environment 100 that includes a code review manager 106 that integrates a code review system 104 with a development environment 102, in accordance with one or more aspects of the present disclosure. The development environment can be, for example, an Integrated Development Environment (IDE), a set of separate development tools such as an editor, a compiler, and other tools accessed by a command line, or other application programs that can be used to create, edit, and modify files that can contain computer program source code.

The development environment 102 includes a code editor 110, which can be used to create and modify source code files 112. Each of the source code files 112 can include text, e.g., a sequence of characters, that represents statements or other elements of program code according to syntax of a programming language. Source code files 112 may include content that is not program source code, e.g., data, text in a human language, or other type of content. A source code file 112 can include changed content 114, e.g., content that has been changed since a previous version or instance of the source code file 112. The changed content 114 can be a change to an existing source code file 112, in which case a portion of the file 112 has been changed, or a change that corresponds to a new source code file 112, in which case the changed content 114 can be the entire source code file 112. Each source code file 112 can be stored in a version control system, in which case each source code file 112 can be associated with a version number or identifier, and changed content 114 can correspond to a difference in content between versions of a source code file 112.

A code review system 104 can be used by a second user 132 to review and approve or reject proposed changes 140 to source code files 112. A proposed change 140 can be generated by the first user 130 by, for example, "checking in" a source code 112 file having changed content 114 to a version control system or otherwise saving the source code file 112. The code review system may detect the changed content 114 in the source code file 112 and generate a proposed change 140, or the first user 130 may submit the proposed change 140 to the code review system, for example. If the second user 132 approves a proposed change 140, the changed content 114 associated with the proposed change 140 can be accepted into a code base of a project, e.g., checked into the version control system to be included in the project. A project may be, for example, a set of source code files that are used to create an executable program.

A proposed change 140 can include a change identifier (ID) 142, e.g., a numeric value or other identifier that represents the proposed change 140, a file identifier 144, votes 146, an owner identifier 148, and one or more reviewer identifiers 150. The owner identifier 148 can identify a user who is an owner of the proposed change 140. The owner 148 can be the user who created or saved the changed content 114 that corresponds to the proposed change 140, e.g., the first user 130. The file identifier 144 can identify a file 112 that contains changed content 114 associated with the proposed change 140. The file identifier 144 can be, e.g., a file name that identifies the source code file 112. The file identifier 144 can identify a file 112 that contains changed content 144 or a file that contains differences from another file (e.g., a previous version of the file), in which case the differences can represent the proposed change 140. The reviewers 150 can identify users of the code review system 104 who are assigned to review the proposed change 140. The reviewers can include a second user 132, who is a user of the code review system 104. Each of the votes 146 can be provided by a reviewer 150 and can indicate a result of a review performed by the reviewer 150. Each vote 146 may indicate an approval or rejection of the proposed change 140, or a degree of approval (e.g., approve with no further review needed, approve but suggest or require further review, reject with further review requested or required, or reject without possibility of further review).

The proposed change 140 can be associated with at least one review comment 152, which can be provided by one of the reviewers 150. For example, the second user 132 can review the proposed change 140 and submit feedback on the proposed change 140 to the code review system. In particular embodiments, the first user 130 or the second user 132 can use the development environment 102 to review the proposed change 140 in the editor 110 and submit the review comment 152 using the user interface of the development environment 102, e.g., instead of using a user interface of the code review system 104.

To submit a review comment 152, a reviewer (e.g., a second user 132) can invoke a suitable command in the code review system 104. In particular embodiments, the command to submit a review comment can be invoked in the development environment 102, which can send a request to the code review system 104 to create or update a review comment via the code review manager 106. Invoking the command can be preceded by or followed by selecting a portion of the source code file 112 to which the review comment is directed. The portion of the source code file to which the review comment is directed is referred to herein as reviewed content 156. The reviewer 150 can provide comment content 154 for the review comment. The comment content 154 can be text, e.g., "Please appropriate input validation" or "Consider using a more efficient sorting algorithm."

The reviewed content 156 selected by the reviewer can be identified by a reviewed content location 158 in the source code file. Alternatively or additionally, the reviewed content 156 can be a copy of the content of the source code file 112 copied from the content location 158. The location of the reviewed content 156 in the source code file 112 can be specified as, for example, a particular line in the file 112 (which can be represented by a line number), a selected block of characters in the file (which can be represented by a start position and an end position in the file), the entire file, or other identified portion of the file.

A code review manager component 106 can integrate the code review system 104 with the development environment 102. The code review manager 106 can receive the review comment 152 from the code review system, send the review comment 152 to the development environment 102 and perform other actions that enable the development environment 102 to interact with the code review system 104. The code review manager 106 can be, for example, a plugin or process that communicates with one or more components of the code review system 104 and also communicates with one or more components of the development environment 102. The communication can be via a computer network, inter-process communication, intra-process communication, or other suitable technique for passing information to and from the code review system 104 and the development environment 102.

The code review manager 106 can include a review activity monitor 164, a notifier 166, an Add Review Comments component 170, and a Remove Review Comments component 180. The activity monitor 168 can detect or otherwise identify and receive review comments 152 from the code review system 104, and send the identified review comments 152 to the user notifier 164, which can send each the review comment 152 to the development environment 102. If a reviewer 150 submits a review comment 152, the activity monitor 168 can detect and retrieve the review comment 152, and send it to the user notifier 164. The activity monitor 168 can also identify previously-submitted review comments (e.g., submitted prior to the code review manager 106 beginning execution) and send the previously-submitted review comments 152 to the development environment 102.

As an example, activity monitor 168 can identify review comments 152 that have not previously been sent to the development environment 102. Activity monitor 168 can cause the user notifier 164 to send a notification 116 to the development environment 102 in response to detecting a review comment 152. The notification 116 can include a message such as "New Review Submitted for Change <ID>" where <ID> is the change ID 142. The notification 116 can include other information, such as the proposed change 140, the name of the reviewer 150 who submitted the review comment 152, the comment content 154, and other information included in the proposed change 140 or otherwise related to the review comment 152.

The development environment 102 can receive the notification 116 and present a representation of notification 116 to the first user 130, e.g., by displaying a user interface component such as a pop-up or dialog box that shows or otherwise presents the notification to a user such as the first user 130. For example, the notification 116 can be displayed as a user interface component or text message that includes the message "New Review for Change 10" where "10" is the Change ID 142 associated with the review comment 152 for which the notification 116 has been generated. The presented representation of the notification 116 ("notification") can include additional information associated with the review comment 152 or proposed change 140, such as the information listed above that can be included in the notification 116.

The first user 130 can invoke a command in the development environment 102, e.g., "View Review Comments," to cause the development environment 102 to display or otherwise present review comments 152. The command can be selected from the notification 118 or from another user interface component of the development environment 102. Thus the notification 118 can inform the first user 130 that one or more new review comments 152 are available, so that the first user 130 can view the new review comments 152. Alternatively or additionally, the first user 130 can invoke the command to view review comments at other times, e.g., not necessarily as a response to the notification 116. In particular embodiments, the development environment 102 can automatically invoke the command to view review comments in response to the notification 116, e.g., if a user preference specifies that new review comments are to be viewed automatically.

A Request Review Comments component 118 of the development environment 102 can send a request for review comments to the code review manager 106. The Request Review Comments component 118 can be invoked by the view review comments command described above, for example, or at other times, e.g., periodically at a specified time interval, when the development environment 102 begins execution, or at other suitable times. The request for review comments can be received by an Add Review Comments component 170 of the code review manager 106. Add Review Comments 170 includes an Add Review Comments to User Interface 172 component, which can send a request to the development environment 102 to add one or more review comments 152 to a user interface such as that of the editor 110. A Display Source Code File with Review Comments component 120 of the development environment can present the review comments 152 at their corresponding locations in the source code file 112 as described below with respect to FIG. 4.

The Add Review Comments component 170 can also include an Add Review Comments to File 174 component, which can add one or more review comments 152 to the source code file 112 that corresponds to each review comment 152, as described below with respect to FIG. 3A. Adding the review comments 152 to the source code file 112 can cause the development environment 102 to automatically reload the file 112 and display the added review comments 152. The Add Review Comments to File component 174 can also send a request to the development environment 102 to reload the file 112 or display a portion of the file 112 that contains the review comment 152. For example, the Display Source Code File with Review Comments component 120 can receive the request and reload or display the portion of the file 112.

Each review comment 152 can be removed from the source code file 112 in response to a request from the first user 130, or in response to a determination that the first user 130 has made a change to the source code file 112 that can address the review comment. The first user 130 can invoke a command in the development environment 102, e.g., "Remove Review Comments," to remove review comments 152. Alternatively or additionally, the development environment 102 can automatically remove review comments in response to particular criteria. For example, a review comment can be removed in response to detecting that the reviewed content 156 of the source code file 112 associated with the review comment 152 has changed subsequent to presentation of the review comment 152. Review comments can be removed by a Request Removal of Resolved Review Comments 122, which can be invoked by the development environment 102, e.g., in response to the command to remove review comments or upon detecting that the contents of the source code file 112 have changed (or at other times, such as at periodic intervals). The Request Removal of Resolved Review Comments component 122 can invoke a Remove Review Comments component 180 of the code review manager 106.

The Remove Review Comments component 180 can identify resolved (or likely resolved) review comments in a source code file 112 by searching the file 112 for comments 152 (e.g., for comment content 154) that has changed since the corresponding review comment 152 was presented. If a review comment 152 has changed, then the review comment 152 may have been addressed by the first user 130, and the review comment 152 presented in the user interface of the development environment 102 or the file 112 can be removed from the user interface of the development environment 102 or the file 112, as described below.

The code review manager 106 can perform an action in response to identifying a resolved review comment or removing a review comment. The action can be, for example submitting the source code file 112 to the code review system 104 with an indication that the review comment 152 has been addressed. The code review system 104 may then perform a next step in the review process, e.g., sending a notification to the reviewer 150 who submitted the review comment to inform the reviewer 150 that the review comment 152 has been addressed by a revision to the source code file 112. In another example, if the code review system 104 permits or is configured to permit automatically closing review comments in response to the review comments 152 being addressed, then the code review manager 106 can, in response to identifying a resolved review comment or removing a review comment, send a request to the code review system 104 close the review comment 152. This request can be similar to the Approve Change action 236 described with regard to FIG. 2D. If the code review system 104 determines that particular criteria for accepting the source code file 112 into a project are satisfied based on acceptance rules and the action or request sent to the code review system, the code review system can accept the changed content 114 associated with the proposed change 140 into a code base of a project, e.g., by permitting the source code file 112 to be checked into the version control system to be included in the project.

The Remove Review Comments component 180 can identify resolved (or likely resolved) review comments in a source code file 112. The Remove Review Comments component 180 can include a Remove Resolved Review Comments from User Interface component 182, which can remove review comments from the user interface of the development environment 102. This removal can be performed, for example, if the comments were added by the Add Review Comments to User Interface component 172. Particular review comments can be removed from the user interface by removing or deactivating the user interface elements in which the review comments are presented.

The Remove Review Comments component 180 can also include a Remove Resolved Review Comments from File component 184, which can remove review comments from the source code file 112. This removal can be performed, for example, if the comments were added by the Add Review Comments to File component 174. Particular review comments can be removed from the source code file 112 by searching the file 112 for the review comment content 154 and removing the content 154, or by searching the file 112 for the change ID 142 (if the change ID 142 is a unique identifier) or other string of characters that is included in each review comment in the source code file 112 and removing comments from the source code file 112 that are associated with the string of characters.

The Remove Review Comments component 180 can send a request to the development environment 102 to display the source code file 112, e.g., after the component 180 has removed resolved review comments. Alternatively or additionally, the development environment 102 can detect that the source code file 112 has changed, and display the updated content of the file 112 independently of a request from the code review manager 106. The development environment 102 can include a Display File component 124 that can display the source code file 112 in response to a request from the Remove Review Comments component 180, or in response to detecting that the source code file 112 has changed, as can occur when the source code file 112 is modified to add or remove review comments as described above.

Although the source code file 112 is described as being a file in the examples herein, the source code file 112 can be any suitable data item or object, such as a data structure in the editor 110 or a data structure persisted to storage media. Further, although the source code file 112 is described as containing source code, the source code file 112 can contain any data, such as pseudo code, text, XML-format data, and so on.

Figure 2A:
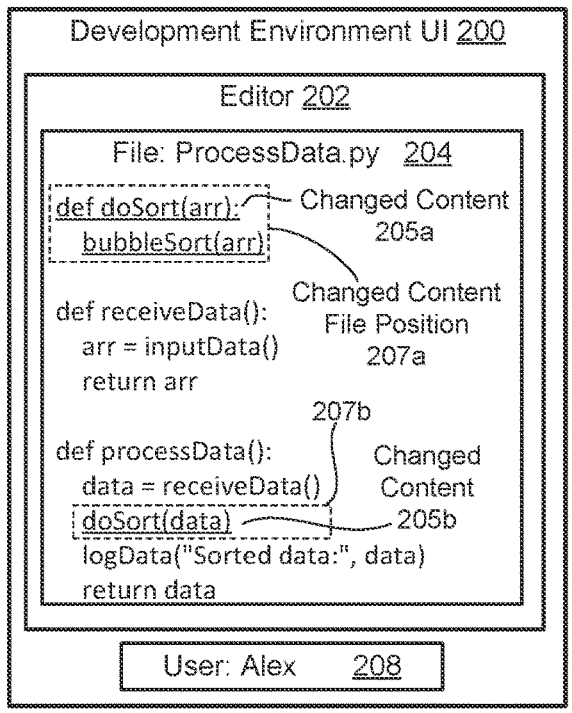
FIG. 2A depicts an example user interface of a development environment editor editing example program code, in accordance with one or more aspects of the present disclosure.

FIG. 2A depicts an example user interface ("UP") 200 of a development environment editor 202 editing example program code, in accordance with one or more aspects of the present disclosure. The editor 202 presents a source code file 204 ("ProcessData.py"), which contains source code in the PYTHON programming language. The file 204 corresponds to the source code file 112 of FIG. 1. The development environment UI 200 is being used by a user named Alex 208. User Alex 208 corresponds to the first user 130 of FIG. 1. The UI 200 presents the source code file 204 to user Alex 208.

The source code file 204 includes two items of changed content 205a, 205b, which are underlined for explanatory purposes. The changed content 205a, 205b can be created by user Alex 208 using the editor 202, for example. The changed content has been added to the file 204 recently (e.g., since the file 204 was last reviewed, or since the previous version of the file was stored in a version control system). Changed content 205a contains the source code fragment "def doSort(arr): bubbleSort(arr)". Changed content 205a is stored at a position in the file 204 labeled Reviewed Content File Position 207a. The position 207a is in the portion of the file 204 displayed in the editor 202 shown by the rectangular dotted line around the changed content 205a.

The position of the changed content 205a in the file 204 can be specified by a numeric offset of the beginning of the changed content 205a from the beginning of the file and at least one of an indication of the length of the changed content 205a or a numeric offset of the end of the changed content 205a from the beginning of the file. Alternatively or additionally, the position of the changed content 205a can be specified by one or more line numbers (e.g., lines 1 and 2 if the changed content 205a starts at the beginning of the file 204)

Changed content 205b contains the source code fragment "doSort(data)". Changed content 205b is stored at a position in the file 204 labeled Changed Content File Position 207b. The position 207b is in the portion of the file 204 displayed in the editor 202 shown by the rectangular dotted line around the changed content 205b. The position 207b of the changed content 205b can be specified similarly to the position 207a of the changed content 205a as described above. For example, the position 207b of the changed content 205b can be specified as line 10 if the position of changed content 205a is lines 1 and 2.

Figure 2B:
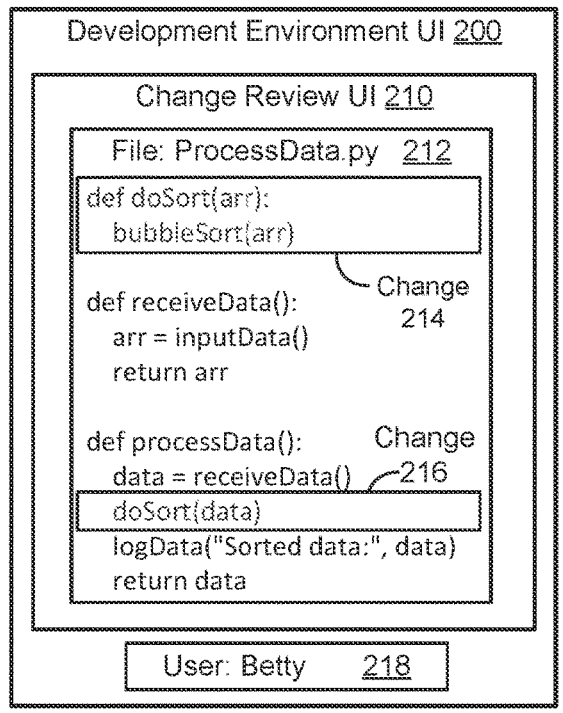
FIG. 2B depicts an example change review user interface presenting example changes to source code, in accordance with one or more aspects of the present disclosure.

FIG. 2B depicts an example change review user interface 210 presenting example changes to source code, in accordance with one or more aspects of the present disclosure. The Change Review UI 210 presents changes 214, 216 in a source code file 212 ("ProcessData.py"), which corresponds to the source code file 204 shown in the editor 202 of FIG. 2A. The Change Review UI 210 is being used by a reviewing user named Betty 218. User Betty 218 corresponds to the second user 132 of FIG. 1. The Change Review UI 210 can present the source code file 212 and the changes 214, 216 to the reviewing user. Changes 214, 216 correspond to the changed content 205a, 205b, respectively, of FIG. 2A. The changes 214, 216 can be presented (e.g., indicated) in the file 212 by emphasis, such as a different background color or shading from other portions of the file 212. The emphasis can also include lines or rectangles drawn around the changes 214, 216. Although the Change Review UI 210 is described as being a component of the development environment UI 200, the source code file 212 can also be displayed and reviewed in other suitable user interfaces, such as a user interface of the code review system 104 of FIG. 1.

Figure 2C:
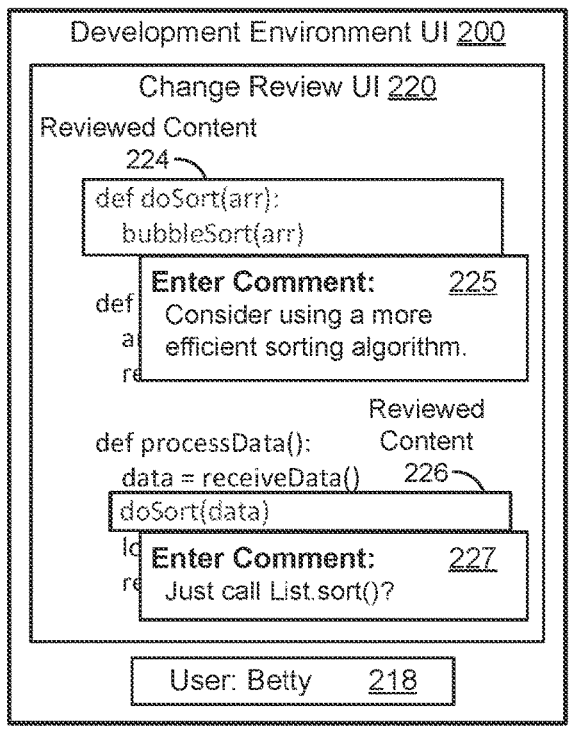
FIG. 2C depicts an example change review user interface receiving review comments on example program code, in accordance with one or more aspects of the present disclosure.

FIG. 2C depicts an example change review user interface 220 receiving review comments on example program code, in accordance with one or more aspects of the present disclosure. The reviewing user Betty 218 has selected the text of change 214 and invoked a command to create a first review comment for the selected text. As a result, change 214 has become reviewed content 224. The Change Review UI 220 presents a text input component 225 in which the reviewing user can provide the text of a review comment for reviewed content 224. In this example, the text of the first review comment is "Consider using a more efficient sorting algorithm."

The reviewing user has also selected the text of change 216 and invoked a command to create a second review comment for the selected text. As a result, change 216 has become reviewed content 226. The Change Review UI 220 presents a text input component 227 in which the reviewing user can provide the text of a review comment for reviewed content 226. In this example, the text of the second review comment is "Just call List.sort( )?"

Figure 2D:
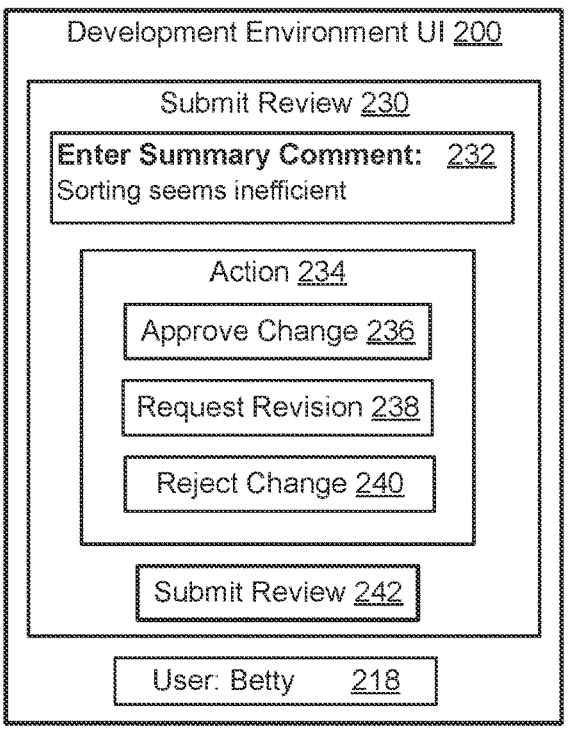
FIG. 2D depicts an example change review user interface submitting a review of example program code, in accordance with one or more aspects of the present disclosure.

FIG. 2D depicts an example review user interface submitting a review of example program code, in accordance with one or more aspects of the present disclosure. A Submit Review user interface (UI) 230 can be presented when a reviewing user Betty 218 invokes a command to submit review comments on the file 212. The Submit Review UI 230 presents a text input component 232 in which the user can provide the text of a summary comment. In this example, the text of the summary comment is "Sorting seems inefficient." The Submit Review UI 230 also presents an Action selection component 234 from which the reviewing user can select an action to perform for the submitted review comments. The action can be one of Approve Change 236, Request Revision 238, or Reject Change 240 in this example. The Approve Change 236 action indicates that the reviewing user approves the change that has been reviewed. The Request Revision 238 action indicates that the reviewing user requests that revisions be made to the file 212. The Reject Change 240 action indicates that the reviewing user does not approve the change and does not request any revisions. The actions 234 can correspond to the vote(s) 146 of FIG. 1. The reviewing user can select a Submit Review button 242 to submit the review comments to the code review system 104. If the code review system 104 determines that particular criteria for accepting the source code file 112 into a project are satisfied based on the acceptance rules and the action, the code review system can accept the changed content 114 associated with the proposed change 140 into a code base of a project, e.g., by permitting the source code file 112 to be checked into the version control system to be included in the project.

FIG. 3A depicts an example user interface of a development environment editor 202 displaying a file 302 into which review comments 304 have been inserted at positions 306, in accordance with one or more aspects of the present disclosure. A first review comment 304a having the content "## [Betty] Sorting seems inefficient" that corresponds to the summary content of FIG. 2D has been inserted into the source code file 204 (of FIG. 2A), as shown in the source code file 302. The first review comment 304a is inserted at Review Comment File Position 306a. Summary comments are not necessarily associated with particular reviewed content, so the file position for summary comments can begin at the start of the file, or at a position in the file prior to the beginning of the program code. Accordingly, the Review Comment File Position 306a starts at the beginning of the file 302 in this example. The first review comment 304a includes the text "Sorting seems inefficient" preceded by a PYHON language comment character ("#") and a second "#" character, which indicates that the programming language comment is a review comment. The first review comment 304a also includes the text "Betty" to indicate that the reviewer who submitted the comment is the user Betty. Other characters or strings can be included in the review comment 304a that is inserted into the file 302, such as a unique identifier that corresponds to the change ID, as described above.

A second review comment 304b having the content "##Consider using a more" and "##efficient sorting algorithm" has been inserted into the source code file 204 at a position shown as Review Comment File Position 306b adjacent to and above the reviewed content 224, as shown in the source code file 302. A third review comment 304c having the content "##Just call List.sort( )?" has been inserted into the source code file 204 at a position shown as Review Comment File Position 306c on the same line as the reviewed content 226, as shown in the source code file 302.

FIG. 3B depicts an example user interface of a development environment editor 202 displaying a file 204 containing reviewed content 305, in accordance with one or more aspects of the present disclosure. Each item of reviewed content 305 displayed in the file 204 by the editor 202 has an associated reviewed content location 308. The location 308 of each item of reviewed content 305 can include the characters of a reviewed source code fragment, for example. Each reviewed content location 308 is shown as a dashed rectangle around the corresponding item of reviewed content 305. The dashed rectangle can be, for example, a bounding box of the reviewed content 305, or a background of the characters of the review content. The reviewed content location 308 can include the area inside the dashed rectangle and can be specified by the coordinates of corners of the rectangle, for example. In other examples, the reviewed content location 308 can be specified by one or more points, text line numbers, character positions on lines (e.g., offsets from the beginning of the line), pixel coordinates (e.g., upper left and lower right pixels of a bounding box surrounding the reviewed content 305a, such as the dashed rectangle), or other suitable information. In the example of FIG. 3B, the reviewed content 305a is displayed at reviewed content location 308a, and the reviewed content 305b is displayed at reviewed content location 308b.

FIG. 3C depicts an example user interface of a development environment editor 202 displaying a file 204 containing review comments 314 displayed at review comment locations 316, in accordance with one or more aspects of the present disclosure. A summery review comment 314a ("Sorting seems inefficient") is displayed at a review comment location 316a, which is at the beginning of the file 204. As described above with regard to FIG. 3A, summary comments are not necessarily associated with particular reviewed content in a source code file. Thus, summary comments can be displayed at the beginning of the file or other predetermined positions in the file, as shown by a summary review comment location 316a. If the file 204 is scrolled down in the editor 202 so that the beginning of the file is no longer visible, the summary review comment 314a, like other review comments 314, can disappear from the visual presentation in the user interface of the editor 202. Alternatively, since the summary review comment 314a can be a summary of multiple review comments that are directed to one or more source code files, the summary review comment 314a can be displayed at the top of the editor 202 (or other designated position) so that the summary review comment 314a is visible regardless of which portion of the file 204 is displayed in the editor 202.

A review comment 314b ("Consider using a more efficient sorting algorithm.") is displayed at a review comment location 316b, which is adjacent to and above the reviewed content location 308a of the associated reviewed content 305a. In other examples, the review comment location 316b can be within a threshold distance of the reviewed content location 308a. The threshold distance can be specified in units such as text lines or pixels (e.g., within 50 pixels, which can mean that distance between the closest points on the bounding boxes of the review comment 314b and the reviewed content 305a is less than 50 pixels), or other units, such as centimeters, inches, or text characters.

FIG. 3D depicts an example user interface of a development environment editor 202 displaying a file 204 containing review comments 314 displayed at review comment locations 316, in accordance with one or more aspects of the present disclosure. A review comment 314c ("Just call List.sort( )? [Betty]") is displayed at a review comment location 316c, which is adjacent to and below the reviewed content location 308b of the associated reviewed content 305b ("doSort(data)"). In other examples, the review comment location 316c can be adjacent to the reviewed content location 308b on the right or left, or within a threshold distance of the reviewed content location 308b on the right or left.

Figure 4:
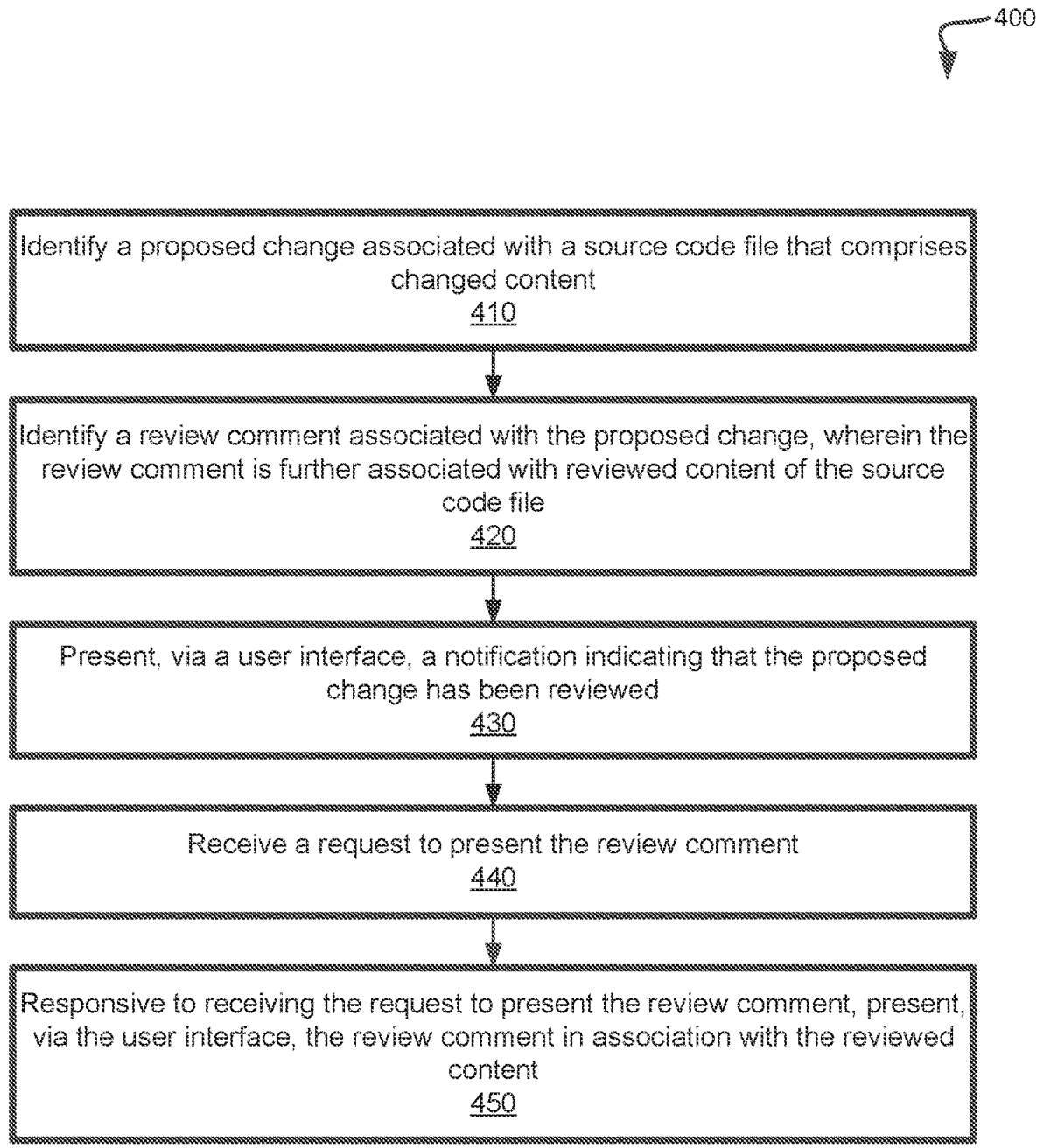
FIG. 4 depicts a flow diagram of an example method for presenting review comments in a user interface of a development environment, in accordance with one or more aspects of the present disclosure.

FIG. 4 depicts a flow diagram of an example method 400 for presenting review comments in a user interface of a development environment, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 400 may be performed by computing device and may begin at block 410. At block 410, a computing device may identify a proposed change associated with a source code file that comprises changed content. The proposed change may be submitted to a code review system by a first user. The proposed change may include addition of one or more characters, deletion of one or more characters, or changing one or more characters of the source code file. The proposed change may include change content such as changed content 205a of the source code file 204 shown in FIG. 2A. The changed content may be determined, for example, by computing differences between current content of the source code file, which corresponds to a current version, and previous content of the source code file, which corresponds to a previous version. The changed content may be provided by an owner of the source code file, and the owner may be the first user of the computing device.

At block 420, the computing device may identify a review comment associated with the proposed change, wherein the review comment is further associated with reviewed content of the source code file. The review comment may be, for example, text provided by a second user to a comment review system. The second user may specify the reviewed content to which the review comment is directed, e.g., by selecting the reviewed content in a user interface of the comment review system. The reviewed content may include any portion of the source code file. Thus, the reviewed content may be at least a portion of the changed content, though the reviewed content may alternatively or additionally include a portion of the source code file that does not include the changed content. The review comment may be provided by a reviewer, who may be a second user of the computing device.

At block 430, the computing device may present, via a user interface, a notification indicating that the proposed change has been reviewed. The notification may correspond to the notification 116 and the proposed change may correspond to the proposed change 140 of FIG. 1. The notification may be presented to the first user, who may be an owner 148 (e.g., author or creator) of the proposed change 140. The owner 140 may correspond to the first user 130. The notification 116 may include a change identifier 142 that identifies the proposed change 140. The notification 116 may also include other information, such as the name(s) of one or more reviewers 150 associated with one or more review comments 152 that have been provided for the proposed change. The notification 116 may include other information about the proposed change 140, such as a name or like to the source code file 144, vote(s) 146. The notification 116 may also include or provide links to at least a portion of the comment content 154 and/or the reviewed content 156 of the source code file 112.

At block 440, the computing device may receive a request to present the review comment. The request may have been generated by the development environment 102 in response to a user interface interaction in which the first user 130 requested that review comments (e.g., the review comments associated with the proposed change identified by the notification 116) be presented in the development environment 102. Alternatively or additionally, the request may have been generated by the development environment 102 in response to the notification 116 or another notification from the code review manager 106 without input from the first user 130 (e.g., automatically).

At block 450, the computing device may, responsive to receiving the request to present the review comment, present, via the user interface, the review comment in association with the reviewed content. The computing device may present the review comment in association with the reviewed content to the first user via the user interface. The user interface may be a user interface 200 of a development environment, e.g., in an editor 202. In a particular embodiment, the review comment may be presented by presenting content of a modified source code file, that includes the review comment, such as the file 302 of FIG. 3A. The review comment may be presented in visual association with the reviewed content in the user interface. The visual association can be, e.g., a visual element (such as an arrow pointing from the review comment to the reviewed content, or vice-versa), a common color (e.g., the review comment and the reviewed content being the same color) or similar color (e.g., the review comment and the reviewed content being similar colors, e.g., different shades or hues of the same color, such as light blue text and dark blue text, or light blue background and dark blue background), or other suitable visual element that creates a visual association.

As another example, the review comment can be displayed adjacent to the reviewed content, e.g., as shown by the review comment 314b, which is adjacent to the reviewed content 305a of FIG. 3C. In one example, the review comment 314b is adjacent to the reviewed content 305a because the last line of the review comment ("efficient sorting algorithm") is adjacent to the first line of the reviewed content ("def doSort(arr):"). In another example, the review comment 314b is adjacent to the reviewed content 305a because a border of the rectangular background of the location 316b (shown as a dashed line) of review comment 314b is adjacent to a border of the location 308a (show as a dashed line) of reviewed content 305b. The borders may be adjacent if, for example, the lower horizontal dashed line of the border of location 316b is not separated from the upper horizontal dashed line of the border of location 308a by any pixels, or there are less than a threshold number of pixels or less than a threshold distance between the lower horizontal dashed line of the border of location 316b and the upper horizontal dashed line of the border of location 308a.

As another example, the review comment can be displayed on a line above the reviewed content, e.g., as shown by review comment 304b of FIG. 3A, or displayed after the reviewed comment on the same line as the reviewed comment, e.g., as shown by review comment 304c. As shown in FIG. 3A, the review comment may have been inserted into the source code file as a programming language comment by the code review manager 106 or other component. For example, the code review manager 106 may insert one or more characters that indicate, in a programming language of the file 302, that the review comment is a comment according to the syntax of the programming language. The characters may be, for example, a "#" character, a "//" string, a "/*" string prepended to the review comment and a "*/" string appended to the review comment, or other character(s) or string(s) appropriate for the programming language of the source code contained in the file 302. The review comment may be inserted in the source code file 302 at a location adjacent to the corresponding reviewed content. For example, the review comment may be inserted adjacent to the reviewed comment. Inserting the review comment adjacent to the reviewed comment may be performed by, for example, inserting the review comment on a line preceding the review comment, such that there are no other programming language statements between the review comment and the reviewed content, as shown by the review comment 304b at file position 306b in the file 302 of FIG. 3A. The review comment may be inserted on the preceding line in that way if, for example, the reviewed content includes more than one line of code, or the review comment's length plus the reviewed content's length is greater than a threshold number of characters (e.g., 80 characters or other predetermined line length). As another example, the review comment may be appended to the same line as the reviewed content, such that there are no other programming language statements between the review comment and the reviewed comment, as shown by the comment 304c at file position 306c in FIG. 3A. The review comment may be appended to the same line if, for example, the reviewed content is a single line, or the reviewed content and the review comment fit on a single line because their total length is within a threshold line length (e.g., determined as described above).

In another embodiment, the review comment may be presented by presenting content of source code file, such as the source code file 204, that has not been modified to include the review comment, and presenting the review comment in the user interface 200, e.g., in an editor 202. For example, the review comment 314b is presented at a location 316b adjacent to a location 308a of the reviewed content 305a, as shown in FIG. 3C. Responsive to completing the operations described herein above with references to block 450, the method may terminate.

Figure 5:
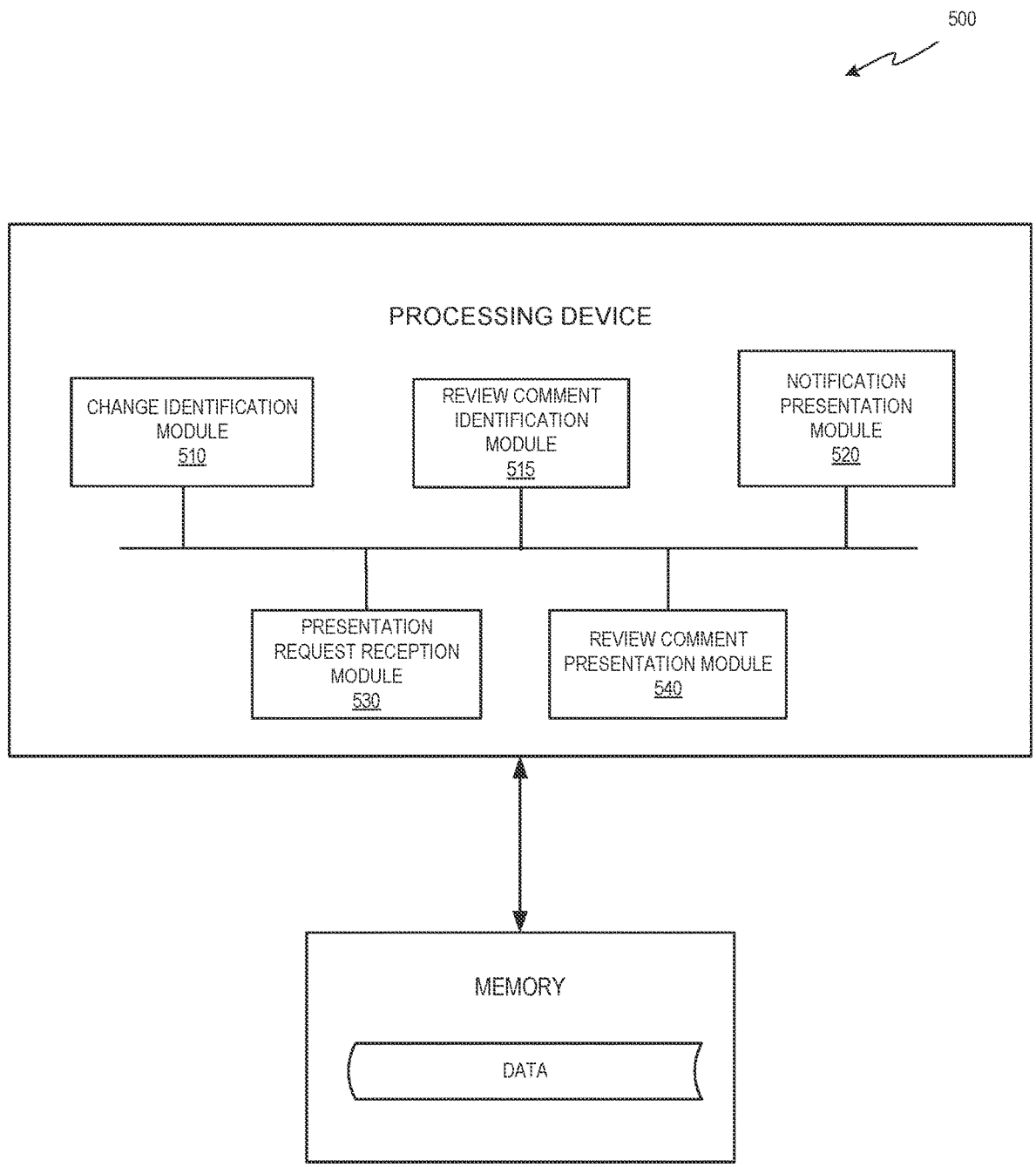
FIG. 5 depicts a block diagram of a computer system operating in accordance with one or more aspects of the present disclosure.

FIG. 5 depicts a block diagram of a computer system 500 operating in accordance with one or more aspects of the present disclosure. One or more of the components of FIG. 1 may execute on computer system 500. Computer system 500 may include one or more processors and one or more memory devices. In the example shown, computer system 500 may include a change identification module 510, a review comment identification module 515, a notification presentation module 520, a presentation request reception module 530, and a review comment presentation module 540.

Change identification module 510 may enable a processor to identify a proposed change associated with a source code file that comprises changed content. The proposed change may be to one or more source code files, and the proposed change may be associated with a source code file that comprises the changed content. The proposed change may be submitted to a code review system by a first user. Review comment identification module 515 may enable the processor to identify a review comment associated with the proposed change, wherein the review comment is further associated with reviewed content of the source code file. Notification presentation module 520 may enable the processor to present a notification indicating that the proposed change has been reviewed. The notification may be presented to the first user, for example. Presentation request reception 530 may cause the processor to receive a request to present the review comment. The request may indicate that the review comment is to be presented to the first user.

Review comment presentation module 540 may enable the processor to, responsive to receiving the request to present the review comment, present, via the user interface, the review comment in association with the reviewed content. The user interface may be a user interface of a development environment, for example. The review comment may be presented in visual association with the reviewed content in the user interface. A line of text of the review comment may be presented at a location adjacent to a line of text of the reviewed content in the user interface. The review comment may be presented at a review comment location in the user interface, the reviewed content is presented at a reviewed content location in the user interface, and the review comment location is visually associated with the reviewed content location. The reviewed content may include a plurality of lines, and the reviewed content location corresponds to a first or last line of the reviewed content. The review comment may comply with a comment syntax of a programming language associated with the source code file, and the review comment may be inserted in the source code file in accordance with the comment syntax.

Figure 6:
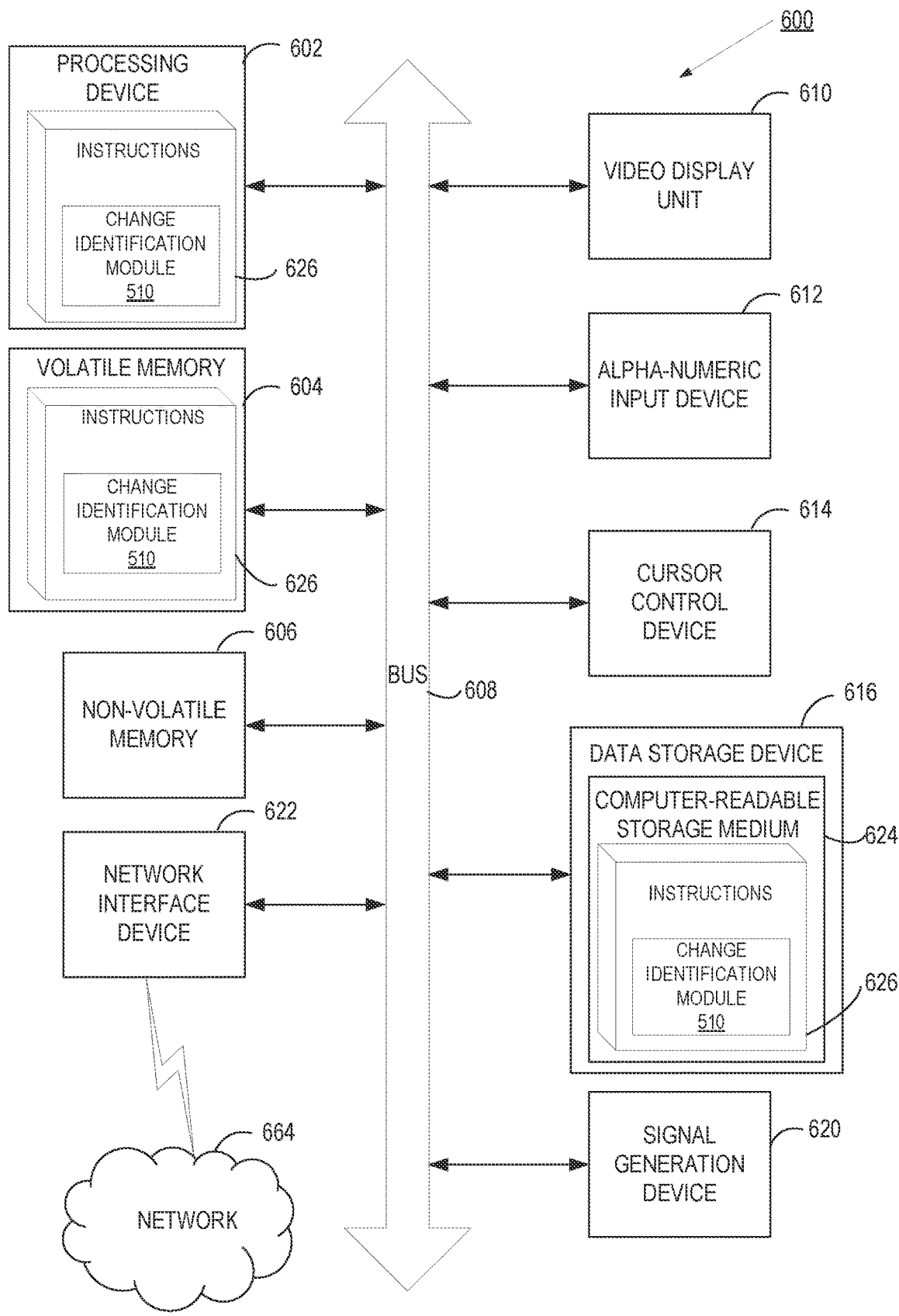
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processor, via a development environment, a proposed change associated with a source code file that comprises changed content;
   receiving, by the processor, via a code review system, a review comment associated with the proposed change, wherein the review comment is further associated with reviewed content of the source code file;
   presenting, by the processor, via a user interface of the development environment, a first notification indicating that the proposed change has been reviewed;
   receiving, via the user interface, a request to present the review comment;
   responsive to receiving the request to present the review comment, presenting, by the processor, via the user interface, the review comment in association with the reviewed content;
   translating the review comment to a programming language comment that complies with a comment syntax of a programming language associated with the source code file;
   inserting the programming language comment in the source code file in accordance with the comment syntax at a position that corresponds to the reviewed content;
   responsive to the inserting of the programming language comment in the source code file, displaying, in the user interface, the source code file;
   detecting a change to the review comment, since the review comment has been presented, to generate a changed review comment;
   searching the source code file for the changed review comment;
   responsive to finding the changed review comment, removing the changed review comment; and
   sending, to the code review system, a second notification indicating that the review comment has been addressed.

2. The method of claim 1, wherein the review comment is presented in visual association with the reviewed content in the user interface.

3. The method of claim 2, wherein a line of text of the review comment is presented at a location adjacent to a line of text of the reviewed content in the user interface.

4. The method of claim 1, wherein the reviewed content is presented at a reviewed content location in the user interface, wherein the reviewed content location is determined in view of a line number that identifies a line in the source code file,
   wherein a review comment location is visually associated with the reviewed content location.

5. The method of claim 4, wherein the reviewed content comprises a plurality of lines, and the reviewed content location corresponds to a first or last line of the reviewed content.

6. The method of claim 4, wherein the reviewed content location is further determined in view of a position of a sequence of one or more characters in the source code file, and the sequence of one or more characters is determined in view of the line number that identifies the line in the source code file.

7. The method of claim 4, wherein the review comment is presented in response to an input received by the user interface, wherein the input corresponds to the reviewed content location.

8. The method of claim 1, further comprising: responsive to determining that at least one character of the reviewed content has changed, determining an updated review status associated with the review comment; and sending, to the code review system, the updated review status.

9. The method of claim 8, wherein the updated review status indicates that the review comment associated with the proposed change has been addressed by a user.

10. The method of claim 1, wherein the position in the source code file at which the review comment is inserted is on a line preceding the reviewed content.

11. The method of claim 1, wherein the position in the source code file at which the review comment is inserted is after the reviewed content and on a same line as the reviewed content.

12. The method of claim 1, wherein a first user is an author of the reviewed content, and wherein the review comment is submitted by a second user.

13. The method of claim 1, wherein the first notification includes a change identifier identifying the proposed change.

14. The method of claim 1, wherein the first notification includes an identifier of a reviewer associated with the review comment.

15. A system comprising:
   a memory; and
   a processing device executing a transaction manager and operatively coupled to the memory, the processing device to:
      receive, via a development environment, a proposed change associated with a source code file that comprises changed content;
      receive, via a code review system, a review comment associated with the proposed change, wherein the review comment is further associated with reviewed content of the source code file;
      present, via a user interface of the development environment, a first notification indicating that the proposed change has been reviewed;
      receive, via the user interface, a request to present the review comment;
      responsive to receiving the request to present the review comment, present, via the user interface, the review comment in association with the reviewed content;
      translate the review comment to a programming language comment that complies with a comment syntax of a programming language associated with the source code file;
      insert the programming language comment in the source code file in accordance with the comment syntax at a position that corresponds to the reviewed content;

responsive to the insert of the programming language comment in the source code file, display, in the user interface, the source code file;

detecting a change to the review comment, since the review comment has been presented, to generate a changed review comment;

searching the source code file for the changed review comment;

responsive to finding the changed review comment, removing the changed review comment; and send, to the code review system, a second notification indicating that the review comment has been addressed.

16. A non-transitory machine-readable storage medium storing instructions that cause a processing device to:

receive, via a development environment, a proposed change associated with a source code file that comprises changed content;

receive, via a code review system, a review comment associated with the proposed change, wherein the review comment is further associated with reviewed content of the source code file;

present, via a user interface of the development environment, a first notification indicating that the proposed change has been reviewed;

receive, via the user interface, a request to present the review comment;

responsive to receiving the request to present the review comment, present, via the user interface, the review comment in association with the reviewed content;

translate the review comment to a programming language comment that complies with a comment syntax of a programming language associated with the source code file;

insert the programming language comment in the source code file in accordance with the comment syntax at a position that corresponds to the reviewed content;

responsive to the insert of the programming language comment in the source code file, display, in the user interface, the source code file;

detecting a change to the review comment, since the review comment has been presented, to generate a changed review comment;

searching the source code file for the changed review comment;

responsive to finding the changed review comment, removing the review comment; and send, to the code review system, a second notification indicating that the review comment has been addressed.

* * * * *